United States Patent [19]
Ishikawa

[11] 4,061,215
[45] Dec. 6, 1977

[54] ENGINE EXHAUST BRAKE CONTROLLED BY TRANSMISSION AND ACCELERATOR

[75] Inventor: Kazuo Ishikawa, Aichi, Japan

[73] Assignee: Aisin Seiki Kabushiki Kaisha, Kariya, Japan

[21] Appl. No.: 692,746

[22] Filed: June 4, 1976

[30] Foreign Application Priority Data
June 11, 1975 Japan .................................. 50-71091

[51] Int. Cl.² ............................................. B60K 21/00
[52] U.S. Cl. ................................ 192/4 A; 192/3 TR; 188/273; 192/4 B
[58] Field of Search ................... 192/4 A, 3 TR, 3 R, 192/4 B; 188/273

[56] References Cited
U.S. PATENT DOCUMENTS

| | | | |
|---|---|---|---|
| 2,895,571 | 7/1959 | Hanebeck | 192/3 TR X |
| 2,940,331 | 6/1960 | Leary | 192/3 TR X |

*Primary Examiner*—Benjamin W. Wyche
*Attorney, Agent, or Firm*—Finnegan, Henderson, Farabow & Garrett

[57] ABSTRACT

An improved internal combustion engine exhaust brake control device for use in conjunction with an automatic transmission, of the type in which the actuation of manual and throttle-connected switches energize a valve retarding the engine exhaust gas flow and creating back pressure which imparts a braking action on the engine, wherein the improvement comprises a switching device actuated by the manual down-shifting of the transmission that, in conjunction with actuation of the throttle-connected switch, automatically activates the exhaust brake device.

3 Claims, 1 Drawing Figure

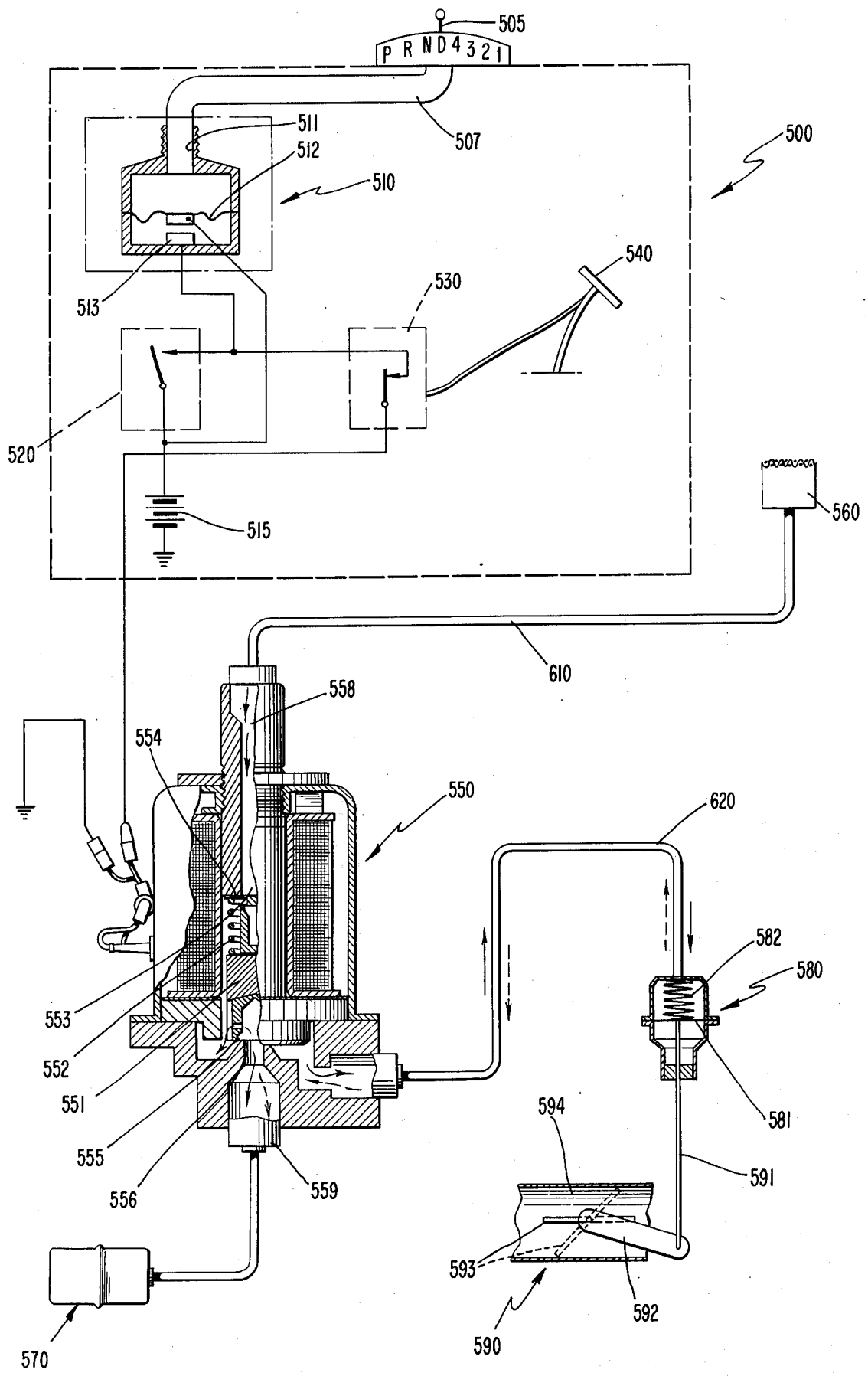

ENGINE EXHAUST BRAKE CONTROLLED BY TRANSMISSION AND ACCELERATOR

BACKGROUND OF THE INVENTION

1. Field of the Invention

This invention relates to an improvement of an internal combustion engine exhaust brake control device for use in conjunction with an automatic transmission. In particular, the invention relates to the addition of switch means actuated by the manual down-shifting of the transmission which automatically energizes the exhaust brake device.

2. Description of the Prior Art

An internal combustion engine exhaust brake device is known as a means of creating exhaust back pressure to impart a braking action on the engine.

The exhaust brake device is generally used to increase the braking effect of the decelerating engine of a diesel engine vehicle. By placing a valve in the exhaust pipe or manifold which, when activated, impedes the flow of the engine exhaust gas, a back pressure is created in the exhaust system of the engine that imparts a braking action on the piston.

The prior art exhaust brake devices are activated by means of a manual switch which has to be actuated by the driver and a throttle switch which is generally connected to and actuated by the accelerator pedal.

Operation of conventional exhaust brakes requires the vehicle operator to actuate the manual switch on each occasion that the exhaust brake is necessary, such as when the vehicle commences a descent down a slope. When the exhaust brake is no longer needed, the conventional system requires the operator to deactivate the manual switch. The necessary manual manipulation of the exhaust brake switch is inconvenient and can be hazardous.

The present invention alleviates the frequent necessity of manually activating and deactivating the exhaust brake. The exhaust brake is most frequently used in addition to down-shifting an automatic transmission. By providing a means of automatically activating the exhaust brake on manually down-shifting the transmission, the added step of manually activating the exhaust brake is eliminated except where the brake is used without down-shifting. In addition, the present invention eliminates the necessity of deactivating the exhaust brake on the frequent occasions where it will have been automatically activated by transmission down-shifting. The switch means which automatically activates the exhaust brake also deactivates the brake on manually shifting from the lower gears to "drive."

SUMMARY OF THE INVENTION

As embodied and broadly described herein, the invention is an improved internal combustion engine exhaust brake control device for use in conjunction with an automatic transmission of the type in which a manually actuated switch in series with a throttle switch electrically activates an exhaust brake, the improvement comprising a switch means electrically connected in parallel with the manual switch and in series with the throttle switch for automatically energizing the exhaust brake on manually down-shifting the automatic transmission and on release of the throttle.

Preferably, the switch means is a pressure-actuated switch in fluid communication with and sensitive to the pressure changes in the hydraulic fluid in the down-shift circuit of the automatic transmission.

In a preferred embodiment, the improved exhaust brake control device is for use in conjunction with a diesel engine and an automatic transmission and is of the type in which a manually actuated switch and accelerator-actuated switch cooperate to electrically energize a solenoid which causes vacuum actuation of a valve in the engine exhaust system retarding exhaust gas flow and creating exhaust gas back pressure that imparts a braking action on the engine piston, the improvement comprising a pressure-actuated switch electrically connected in parallel with the manual switch and in series with the accelerator switch, the pressure switch being activated and deactivated by changes in the pressure in the down-shift hydraulic circuit of the transmission providing automatic energizing and de-energizing of the exhaust brake on manually shifting the transmission to or from a lower gear and on releasing or increasing accelerator pressure.

The invention is intended to provide an improved exhaust brake control device that will automatically energize the exhaust brake and thereby significantly reduce the vehicle operator's manual activation of the exhaust brake.

The invention is also intended to reduce the inconvenience and potential hazard presented by prior art exhaust brake control devices which require specific manual operation.

BRIEF DESCRIPTION OF THE DRAWINGS

The single FIGURE is a schematic depiction of an exhaust brake device and a preferred embodiment of the exhaust brake control device of the invention.

DESCRIPTION OF THE PREFERRED EMBODIMENT

Reference will now be made in detail to the present preferred embodiment of the invention, an example of which is schematically illustrated in the accompanying drawing.

In the single FIGURE, the exhaust brake control device, generally, 500 can be seen. Also depicted is the exhaust brake solenoid 550, the valve 590 in the engine exhaust system 594 and its actuating device, a diaphragm chamber 580. The vacuum needed to actuate the valve 590 in this exhaust brake is depicted as a vacuum tank 570.

To actuate the exhaust brake, an electrical current from the exhaust brake control device 500 is conducted to the exhaust brake solenoid 550. The solenoid 550 is a known type adapted for use in the exhaust brake.

Specifically, atmospheric pressure is conducted through the solenoid 550 from an air filter 560 through conduits 610 and 620 to the diaphragm chamber 580. The diaphragm 581 is mechanically connected by a rod 591 and a lever 592 to the exhaust valve 593, shown by the solid line in the unactuated position wherein exhaust gases pass unobstructed through the exhaust pipe 594. The diaphragm 581, and therefore the exhaust valve 593, is biased to the open position by a spring 582.

When the electric current flows from the control device 500 to the solenoid 550, a valve piston 551 is moved against a bias provided by a spring 552 permitting the valve seat 553 to contact the valve body 554 closing the atmospheric pressure channel 558 through the solenoid 550. On movement of the valve piston 551 against the spring 552 bias, the valve piston's other valve seat 555 no longer contacts the valve housing 556 thereby opening a channel 559 from the vacuum tank 570 through the conduit 620 to the diaphragm chamber 580. The decrease in pressure in the diaphragm chamber 580 causes the diaphragm 581 to move against the spring 582 bias thereby moving the exhaust valve 593 to the position shown by dotted lines, obstructing exhaust gas flow to create the exhaust gas braking effect.

The known exhaust brake control devices provide electrical current to the exhaust brake solenoid 550 by the concurrent actuation of two serially connected switches, a manual switch 520 and a throttle switch 530 which is generally connected to the accelerator pedal 540. When the vehicle operator determines that the exhaust brake is necessary, he must actuate the manual switch 520 which is located on the instrument panel of his vehicle. On actuation, electrical current passes from its source 515 through the manual switch 520 to the throttle switch 530. The latter is actuated when the operator removes pressure from the accelerator pedal 540.

In accordance with the invention, the exhaust brake control device 500 is improved by a switch means 510 electrically connected in parallel with the manual switch 520 such that the actuation of either switch provides current to the throttle switch 530. The switch means 510 is so disposed as to be automatically actuated on the manual down-shifting of the automatic transmission shift handle 505.

Preferably, the switch means 510 is a pressure-actuated switch in fluid communication with the hydraulic down-shift circuit 507 of the transmission. As here embodied, the hydraulic fluid is introduced to the switch 510 through the port 511. The switch consists of contact points 512 and 513 which are pressure sensitive and so arranged that shifting the transmission to a gear below the normal drive position causes points 512 and 513 to contact. On their contact, current is conducted from its source 515 through the switch 510 and to the throttle switch 530. On the release of pressure on the accelerator pedal 540, the exhaust brake solenoid 550 is energized.

It can be seen that the parallel arrangement of the switch means 510 and the manual switch 520 and the automatic actuation of the switch means 510 on down-shifting precludes the necessity of manually switching the manual switch 520. This automatic actuation of the exhaust brake makes more convenient and safe the use by the operator of the exhaust brake.

While a pressure switch 510 is the embodiment shown and described, it may be preferred that the switch means be mechanical or electrical and actuated by movement of the transmission shift lever 505 to lower gear position.

An additional advantage of the claimed improvement invention is the automatic deactivation of the exhaust brake on shifting the transmission lever 505 from a lower gear to the normal drive gear. Although the prior art control devices deactivated the exhaust brake when pressure was applied to the accelerator pedal 540, the brake would be reapplied any time the accelerator pedal 540 pressure was removed unless the manual switch 520 was manually deactuated. The possibility that an operator oversight could cause an unwanted application of exhaust braking is another hazard overcome by the instant invention.

The manual switch 520 is not replaced but merely paralleled by the switch means of this invention, since, on occasion, the vehicle operator may desire to apply exhaust braking without down-shifting.

In operation, the improved exhaust brake control device 500 provides energizing electrical current to the solenoid 550 on concurrent actuation of the pressure switch 510 and the throttle switch 53. The pressure switch 510 is actuated by change in the hydraulic pressure in the transmission down-shift circuit 507 on manual shifting of the transmission shift handle 505 to a lower gear. The throttle switch 530 is actuated by release of pressure on the accelerator pedal 540.

The exhaust brake is deactivated by addition of pressure to the accelerator pedal 540 or shifting the transmission shift handle 505 from a lower gear to normal drive.

It will be apparent to those skilled in the art that various modifications and variations could be made to the improvement to the exhaust brake control device without departing from the scope or spirit of the invention.

What is claimed is:

1. An improved internal combustion engine exhaust brake control device for use in conjunction with an automatic transmission, of the type in which a manually actuated switch in series with a throttle switch electrically activates an exhaust brake, the improvement comprising switch means electrically connected in parallel with the manual switch and in series with the throttle switch for automatically energizing the exhaust brake on manually down-shifting the automatic transmission and on release of the throttle setting.

2. The improved exhaust brake control device of claim 1 wherein the switch means is a pressure-actuated switch in fluid communication with and sensitive to pressure changes in the hydraulic fluid in the down-shift circuit of the automatic transmission.

3. An improved exhaust brake control device for use in conjunction with an automatic transmission of the type in which a manually actuated switch in series with an accelerator switch cooperate to electrically activate a solenoid which causes vacuum-actuation of a valve in the exhaust stage of an internal combustion engine retarding exhaust gas flow and creating exhaust gas back pressure, the back pressure imparting braking action to the piston of the engine, wherein the improvement comprises;

a pressure-actuated switch connected in parallel with said manually actuated switch and in series with said accelerator-actuated switch, said pressure-actuated switch being in fluid communication with and sensitive to pressure changes in the hydraulic fluid on the down-shift circuit of said automatic transmission and providing automatic activation of said exhaust brake control device on the manual shifting of said transmission to a lower gear and release of pressure on said accelerator.

* * * * *